Jan. 29, 1924.

L. SMITH

SHIPPING CRATE

Filed Oct. 12, 1922

1,482,038

Witness:
A. E. Weber

Inventor:
Lester Smith
By
Attorneys

Patented Jan. 29, 1924.

1,482,038

UNITED STATES PATENT OFFICE.

LESTER SMITH, OF PORT WASHINGTON, WISCONSIN, ASSIGNOR OF ONE-FOURTH TO DELOS H. SMITH, ONE-FOURTH TO DELIA B. SMITH, AND ONE-FOURTH TO OLIVER H. SMITH, ALL OF PORT WASHINGTON, WISCONSIN.

SHIPPING CRATE.

Application filed October 12, 1922. Serial No. 594,064.

*To all whom it may concern:*

Be it known that I, LESTER SMITH, a citizen of the United States, and resident of Port Washington, in the county of Ozaukee and State of Wisconsin, have invented certain new and useful Improvements in Shipping Crates; and I do hereby declare that the following is a full, clear, and exact description thereof.

This invention pertains to shipping containers and more particularly to crates used in shipping articles packed in ice, such as fish and the like.

It is common practice, at the present time, to construct containers of this character from a very cheap grade of lumber, inasmuch as they are not returned to the shipper, or used a second time, and consequently are a total loss. In packing fish for shipment, ice is first placed in the bottom of the container and the fish packed in the center of the same. The ice is then packed around and over the fish and the box sealed with a suitable cover. This method has resulted in a great loss to the shipper, inasmuch as the sun or warm air coming into contact with the sides of the box causes the ice adjacent the sides to melt rapidly. After this has taken place for a short period, a portion of the fish packed in the center of the container is permitted to fall to the sides and come into contact with the heated sides of the box, causing them to spoil.

It is therefore an object of the present invention to overcome the foregoing disadvantages and to provide an inexpensive structure in which the contents are sufficiently insulated from the outer walls of the casing to preserve the same and prevent loss from spoilage.

Incidental to the foregoing, a more specific object is to provide a shipping case with detachable, spaced, interior walls forming a thermal insulation for the contents.

A further object resides in the method of positioning the interior walls, whereby they are engaged and held in proper position by one another.

With the above and other objects in view, which will appear as the description proceeds, the invention resides in the novel construction, combination and arrangement of parts, substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof, and in which.

Figure 1:
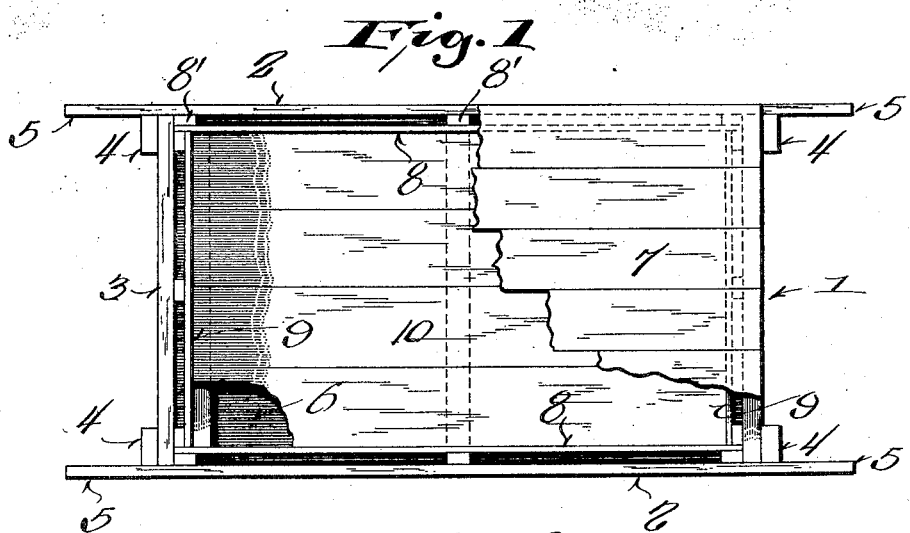
Figure 1 is a plan view of a shipping container constructed in accordance with the present invention, parts being broken away to more clearly illustrate the structural details.
Figure 2:
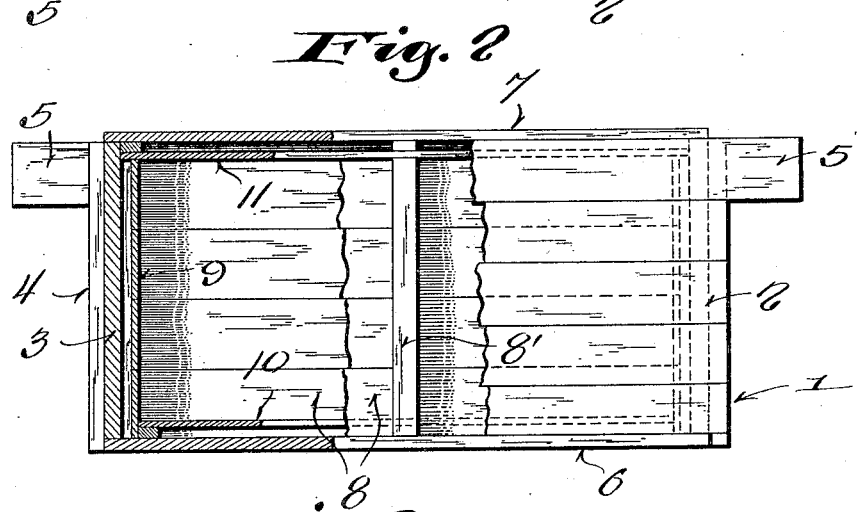
Figure 2 is an elevational view, with parts broken away and in section.
Figure 3:
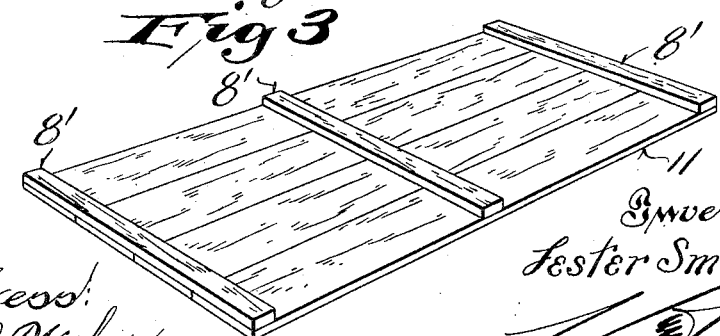
Figure 3 is a perspective view of one of the detachable interior walls.

Referring more particularly to the accompanying drawings, the numeral 1 designates a shipping container of conventional structure, embodying side walls 2 and end walls 3 made up of longitudinal and transverse boards secured together and to the upright strips 4. The top boards of the side walls 2 are extended to form handles 5 to facilitate handling of the containers in shipment. The container is further provided with a bottom 6 and cover 7.

Positioned within the container adjacent the side walls are a pair of interior walls 8 made up of longitudinal boards secured to transverse strips 8', which engage the side walls of the container and serve to space the interior walls therefrom. As disclosed in Figure 1 of the drawings, interior walls 8 extend the full length of the container and are held in their proper position by the interior end walls 9, which are similar in construction to walls 8. Interior bottom wall 10 is snugly fitted within the side walls 8 and end walls 9 to further assist in holding them in their proper position.

Supported by the interior side and end walls is an interior cover 11 which is held in place by the outer container cover 7 when the latter is secured in place.

From the foregoing it will be seen that a complete inner compartment is built up within the container, the same being spaced from the outer walls, thereby forming a thermal insulation which preserves the ice packing within the container and prevents consequent spoilage of the contents.

I claim:—

The combination of an outer shipping container having side, bottom and end walls and a top, and an inner container having a bottom provided with transverse cleats to space it from the outer container bottom, and having side walls extending the full length of the interior of said outer container and contacting with the ends thereof, transverse cleats secured externally of the side walls of said inner container, said inner container having end walls spaced from the end walls of said outer container and located between the side walls of said inner container, and a removable top for said inner container snugly fitting within said outer container and contacting with the end and side walls thereof and provided with cleats upon its upper side, whereby the top of said inner container is held in position when the first mentioned top is in position.

In testimony that I claim the foregoing I have hereunto set my hand at Port Washington, in the county of Ozaukee and State of Wisconsin.

LESTER SMITH.